US 8,306,152 B2

(12) United States Patent
Iwagami

(10) Patent No.: US 8,306,152 B2
(45) Date of Patent: Nov. 6, 2012

(54) MOBILE RADIO COMMUNICATION DEVICE AND CHANNEL ESTIMATE CALCULATION METHOD

(75) Inventor: Norihiro Iwagami, Tokyo (JP)

(73) Assignee: NEC Corporation, Tokyo (JP)

( * ) Notice: Subject to any disclaimer, the term of this patent is extended or adjusted under 35 U.S.C. 154(b) by 1115 days.

(21) Appl. No.: 11/817,053

(22) PCT Filed: Mar. 2, 2006

(86) PCT No.: PCT/JP2006/304522
§ 371 (c)(1),
(2), (4) Date: Aug. 24, 2007

(87) PCT Pub. No.: WO2006/093331
PCT Pub. Date: Sep. 8, 2006

(65) Prior Publication Data
US 2009/0052518 A1 Feb. 26, 2009

(30) Foreign Application Priority Data

Mar. 3, 2005 (JP) ................................. 2005-058680

(51) Int. Cl.
*H03K 9/00* (2006.01)
(52) U.S. Cl. ........ 375/316; 375/260; 375/267; 370/208; 370/210; 455/238.1; 455/441

(58) Field of Classification Search .................. 375/260, 375/316; 455/130, 441, 450, 522
See application file for complete search history.

(56) References Cited

U.S. PATENT DOCUMENTS

| 6,668,172 | B1* | 12/2003 | Yoshimura | 455/441 |
|---|---|---|---|---|
| 7,548,595 | B2* | 6/2009 | Shimomura et al. | 375/316 |
| 2003/0211851 | A1* | 11/2003 | Moon et al. | 455/450 |
| 2005/0020219 | A1* | 1/2005 | Sih et al. | 455/130 |

FOREIGN PATENT DOCUMENTS

| JP | 10-51355 A | 2/1998 |
|---|---|---|
| JP | 2001-127692 A | 5/2001 |
| JP | 2003-163650 A | 6/2003 |
| JP | 2003-332943 A | 11/2003 |
| JP | 2004-7793 A | 1/2004 |
| JP | 2004-15819 A | 1/2004 |

* cited by examiner

*Primary Examiner* — David Ometz
*Assistant Examiner* — Eboni Hughes
(74) *Attorney, Agent, or Firm* — Sughrue Mion, PLLC

(57) ABSTRACT

This mobile radio communication device comprises pilot symbol number determination unit 102 for determining the number of pilot symbol blocks necessary to determine a channel estimate in response to phasing variation, storage unit 104 for storing said determined number of pilot symbol blocks, and unit 103 for using said stored number of pilot symbol blocks to determine a channel estimate when said determined number of pilot symbol blocks exceeds the predetermined number of pilot symbol blocks.

28 Claims, 11 Drawing Sheets

MOBILE RADIO COMMUNICATION DEVICE AND CHANNEL ESTIMATE CALCULATION METHOD

TECHNICAL FIELD

The present invention relates to a mobile radio communication device, and more particularly, a mobile radio communication device that uses a pilot symbol sent with a data symbol when data is decoded to perform channel estimation, and its channel estimate calculation method.

BACKGROUND ART

Although a mobile radio communication device (such as a mobile phone), which is a mobile radio station, communicates with a station via radio waves when a call is placed with the mobile radio communication device, the radio waves emitted from the sending antenna of the station reach the receiving antenna of the mobile radio communication device after being blocked, diffracted, and reflected by various surrounding buildings and terrain roughness. That is to say, a so-called multi-path propagation path is constructed between the mobile radio communication device and the station. In such a mobile radio communication environment, when a call is placed with a mobile radio communication device while traveling on board of an automobile or the like, the phase and amplitude of the radio wave vary with the travel of the mobile radio communication device, causing phasing.

Usually, since a modulation scheme for adjusting the phase and amplitude of a carrier wave is used for a radio wave signal used for communication with the mobile radio communication device serving as a mobile radio station, variation in the phase and amplitude due to this phasing may cause the mobile radio communication device to fail to receive data, or to receive wrong data, resulting in a malfunction. The station may encounter similar problems.

As a solution of this phasing, there is a method of inserting a pilot symbol whose phase and amplitude are known, into a data symbol, and sending the symbol. This method is a method whereby the known pilot symbol is sent from a sending side to a receiving side, the phasing variation received on a radio propagation path is estimated (channel estimation) on the receiving side, and based on the estimated channel estimate, the phase and amplitude of the data symbol are reversed by the amount of variation received on the radio propagation path to eliminate the effect of the phasing.

Conventionally, as a method of inserting a pilot symbol into a data symbol, as disclosed in Japanese Patent Laid-Open No. 2004-07793 (Document 1), and Japanese Patent Application No. 2004-015819 (Document 2), a time multiplexing scheme whereby a pilot symbol is inserted between data symbols, and a parallel scheme whereby a pilot symbol is inserted in parallel with a data symbol are known.

FIG. 10 shows a symbol sequence in the time multiplexing scheme, where pilot symbol blocks ... P1, P2, ... are placed in the data symbol blocks ... D1, D2, ... in a time-shared manner, and transmitted. FIG. 11, which shows a symbol sequence in the parallel scheme, shows a pilot symbol sequence P transmitted in parallel with the data symbol sequence D.

In FIG. 10, although each of the pilot symbol blocks indicated by P1 and P2 constitutes a block containing a plurality of pilot symbols displaying data 1 and 0, the number of pilot symbols within one block is not limited to two or more, and may be one pilot symbol. Each of the data symbol blocks ... D1, D2 ... also constitutes a block containing a plurality of data symbols displaying data 1 and 0. One slot is constituted by the pilot symbol block P1 and the data symbol block D1.

In FIG. 11, each of the pilot symbol P and the data symbol D constitutes a plurality of pilot symbol lines (pilot symbol sequence) and a plurality of data symbol lines (data symbol sequence).

As a parallel scheme, there are many related arts whereby a weight is assigned to a pilot symbol in response to phasing variation, and averaging is performed. For example, those related arts have been disclosed in Japanese Patent Laid-Open No. 2004-007793 (Document 1), and Japanese Patent Application No. 2004-015819 (Document 2).

In addition, related art whereby the number of pilot symbols is controlled in response to movement velocity of a mobile phone has been disclosed in Japanese Patent Laid-Open No. 2001-127692.

However, in all of the above related arts, the number of pilot symbols for calculating a channel estimate has a maximum value with a fixed upper limit, and averaging is performed based on whether or not to assign a weight to the fixed number of pilot symbols; therefore, channel estimate that takes into account the fixed number or more pilot symbols could not be determined.

Usually, for slow phasing, when a lot of pilot symbols are averaged, the accuracy of channel estimation is improved. Meanwhile, for rapid phasing, if averaging is performed beyond the phasing variation period, the rapid phasing cannot be reflected correctly; on the contrary, the accuracy of channel estimation drops. Accordingly, it is known that, for rapid phasing, a small number of pilot symbols are averaged to improve the accuracy of channel estimation.

With a method using weighting of the above related art, rapid phasing can be handled, but the fixed number or more pilot symbols cannot be used for slow phasing because the number of pilot symbols has a maximum value with a fixed upper limit. Particularly, phasing variation little occurs when a mobile radio communication device does not travel, and remains in the same place; there is a request to further improve the accuracy of the channel estimate in such a state.

Thus, for example, a large upper limit can be considered in advance for the number of pilot symbols used for channel estimation; however, simply increasing the upper limit of the number of pilot symbols increases the amount of calculation in cases where weighting is performed, while in cases where weighting is not performed, the accuracy is degraded in rapid phasing environment due to the number of pilot symbols used for channel estimation being fixed at the maximum value, which are problems.

SUMMARY

An exemplary object of the invention is to improve the accuracy of channel estimation against a wide range of phasing variations, for slow phasing, by increasing the number of pilot symbols so as to exceed the upper limit of the number of pilot symbols without increasing the amount of calculation and in an equivalent manner, and for rapid phasing, by a prompt adjustment of the number of pilot symbols to the phasing variation so as to respond immediately with high speed even if the phasing variation changes widely, in response to a phasing variation.

According to an exemplary aspect of the invention, a mobile radio communication device in which the maximum number of pilot symbol blocks that can be received used for one round of channel estimation calculation is fixed, includes pilot symbol number determination unit which determines the number of pilot symbol blocks necessary to determine a channel estimate in response to phasing variation, storage unit which stores the determined number of pilot symbol blocks, and channel estimate calculation unit which determines a channel estimate by using the stored number of pilot symbol blocks when the determined number of pilot symbol blocks exceeds a predetermined number.

According to another exemplary aspect of the invention, a mobile radio communication device in which the maximum number of pilot symbol blocks that can be received used for one round of channel estimation calculation is fixed, includes pilot symbol number determination unit which determines the number of pilot symbol blocks necessary to determine a channel estimate in response to phasing variation, channel estimate calculation unit which calculates a channel estimate by using the determined number of pilot symbol blocks, and storage unit which stores the calculated channel estimate, and the number of pilot symbol blocks used for channel estimation, wherein the channel estimate calculation unit determines a channel estimate by using the number of pilot symbol blocks and the channel estimate stored in the storage unit when the determined number of pilot symbol blocks exceeds a predetermined number.

According to another exemplary aspect of the invention, a mobile radio communication device in which the maximum number of pilot symbol blocks that can be received used for one round of channel estimation calculation is fixed, includes channel estimate calculation unit which calculates a channel estimate with the fixed maximum number of pilot symbol blocks that can be received as an initial value when a channel is estimated using pilot symbols, if a slow state of pre-divided phasing variation is detected, and storage unit which stores the calculated channel estimate after overwriting the previously stored channel estimate, wherein the channel estimate calculation unit comprises a unit which calculates a new channel estimate by using the channel estimate stored in the storage unit when the slow state of pre-divided phasing variation is detected continuously.

According to another exemplary aspect of the invention, a mobile radio communication device in which the maximum number of pilot symbol blocks that can be received used for one round of channel estimation calculation is fixed, includes pilot symbol number determination unit which determines the number of pilot symbol blocks used for channel estimation in response to phasing variation, channel estimate calculation unit which calculates a channel estimate with the fixed maximum number of pilot symbol blocks that can be received as an initial value when a channel is estimated using the determined number of pilot symbol blocks, if slow state of pre-divided phasing variation is detected, and storage unit which stores the channel estimate, and the number of pilot symbol blocks used for channel estimation, wherein the channel estimate calculation unit calculates a new channel estimate based on a new number of pilot symbol blocks in which a predetermined number is added to the stored number of pilot symbol blocks, the stored channels estimate, and a pilot symbol block detected this time when the slow state of pre-divided phasing variation is detected continuously, and the storage unit stores the channel estimate calculated this time and the number of pilot symbol blocks used for channel estimation after overwriting the channel estimate and the number of pilot symbol blocks previously stored in the storage unit, respectively.

According to another exemplary aspect of the invention, a mobile radio communication device having a function for receiving a data symbol and a pilot symbol from a station to estimate a channel of the data symbol with the station from the pilot symbol, includes channel estimation unit which changes the number of pilot symbol blocks used for channel estimation beyond the maximum value of the number of pilot symbol blocks that can be detected in response to phasing variation.

According to another exemplary aspect of the invention, a mobile radio communication device having a function for receiving a data symbol and a pilot symbol from a station to estimate a channel of the data symbol with the station from the pilot symbol, includes storage unit which stores a channel estimate and the number of pilot symbol blocks used for channel estimation, and channel estimate calculation unit which calculate a channel estimate by using the number of pilot symbol blocks and the channel estimate stored in the storage unit when the slow state of pre-divided phasing variation is detected continuously.

According to another exemplary aspect of the invention, a mobile radio communication device having a function for receiving a data symbol and a pilot symbol from a station to estimate a channel of the data symbol with the station from the pilot symbol, includes phasing variation detection unit which detects phasing variation, pilot symbol block number determination unit which determines the number of pilot symbol blocks used for channel estimation in response to phasing variation detected by the phasing variation detection unit, channel estimate calculation unit which determines a channel estimate by using the determined number of pilot symbol blocks, and storage unit which stores the channel estimate, and the number of pilot symbol blocks used for channel estimation, wherein the channel estimate calculation unit uses the number of pilot symbol blocks and the channel estimate stored in the storage unit to perform channel estimation when the slow state of the pre-divided phasing variation is detected continuously by the phasing variation detection unit, on the other hand, discards the number of pilot symbol blocks stored in the storage unit, and uses an average value of the newly determined number of pilot symbol blocks and a newly detected number of pilot symbol blocks to perform channel estimation when the rapid state of the pre-divided phasing variation is detected.

According to another exemplary aspect of the invention, a mobile radio communication device having a function for receiving a pilot symbol to estimate a channel, includes channel estimation unit which changes the number of pilot symbol blocks used for channel estimation in response to phasing variation.

According to another exemplary aspect of the invention, a channel estimate calculation method, includes the steps of determining the number of pilot symbol blocks necessary to determine a channel estimate in response to phasing variation, storing the determined number of pilot symbol blocks, and determining a channel estimate by using the stored number of pilot symbol blocks when the determined number of pilot symbol blocks exceeds a predetermined number.

According to another exemplary aspect of the invention, a channel estimate calculation method, includes the steps of determining the number of pilot symbol blocks necessary to determine a channel estimate in response to phasing variation, calculating a channel estimate by using the determined number of pilot symbol blocks, storing the calculated channel estimate, and the number of pilot symbol blocks used for channel estimation, and determining a channel estimate by using the number of pilot symbol blocks and the channel estimate which are stored, when the determined number of pilot symbol blocks exceeds a predetermined number.

According to another exemplary aspect of the invention, a channel estimate calculation method, includes the steps of calculating a channel estimate with the fixed maximum number of pilot symbol blocks that can be received, which are used for one round channel estimation calculation, as an initial value when a channel is estimated using pilot symbols, if a slow state of pre-divided phasing variation is detected, storing the calculated channel estimate after overwriting the previously stored channel estimate, and calculating a new channel estimate by using the stored channel estimate when the slow state of pre-divided phasing variation is detected continuously.

According to another exemplary aspect of the invention, a channel estimate calculation method, includes the steps of determining the number of pilot symbol blocks used for channel estimation in response to phasing variation, calculating a channel estimate with the fixed maximum number of pilot symbol blocks that can be received, which are used for one round channel estimation calculation, as an initial value when a channel is estimated using the determined number of pilot symbol blocks, if a slow state of pre-divided phasing variation is detected, and storing the channel estimate, and the number of pilot symbol blocks used for channel estimation, wherein the step of calculating a channel estimate includes a step of calculating a new channel estimate based on a new number of pilot symbol blocks in which a predetermined number is added to the stored number of pilot symbol blocks, the stored channels estimate, and a pilot symbol block detected this time when the slow state of pre-divided phasing variation is detected continuously, and a step of storing the channel estimate calculated this time and the number of pilot symbol blocks used for channel estimation after overwriting the channel estimate and the number of pilot symbol blocks previously stored, respectively.

According to another exemplary aspect of the invention, a channel estimate calculation method of a mobile radio communication device having a function for receiving a data symbol and a pilot symbol from a station to estimate a channel of the data symbol with the station from the pilot symbol, wherein the number of pilot symbol blocks used for channel estimation is changed beyond the maximum value of the number of pilot symbol blocks that can be detected in response to phasing variation.

According to another exemplary aspect of the invention, a channel estimate calculation method of a mobile radio communication device having a function for receiving a data symbol and a pilot symbol from a station to estimate a channel of the data symbol with the station from the pilot symbol, includes the steps of storing a channel estimate and the number of pilot symbol blocks used for channel estimation, and performing channel estimation by using the number of pilot symbol blocks and the channel estimate which are stored, when the slow state of pre-divided phasing variation is detected continuously.

According to another exemplary aspect of the invention, a channel estimate calculation method of a mobile radio communication device having a function for receiving a data symbol and a pilot symbol from a station to estimate a channel of the data symbol with the station from the pilot symbol, includes the steps of detecting phasing variation, determining the number of pilot symbol blocks used for channel estimation in response to phasing variation detected in the step of detecting phasing variation, determining a channel estimate by using the determined number of pilot symbol blocks, and storing the channel estimate, and the number of pilot symbol blocks used for channel estimation, wherein the step of determining a channel estimate uses the number of pilot symbol blocks and the channel estimate, which are stored, to perform channel estimation when the slow state of the pre-divided phasing variation is detected continuously by the step of detecting phasing variation, on the other hand, discards the stored number of pilot symbol blocks, and uses an average value of the newly determined number of pilot symbol blocks and a newly detected number of pilot symbol blocks to perform channel estimation when the rapid state of the pre-divided phasing variation is detected.

EXEMPLARY EMBODIMENT

Figure 1:
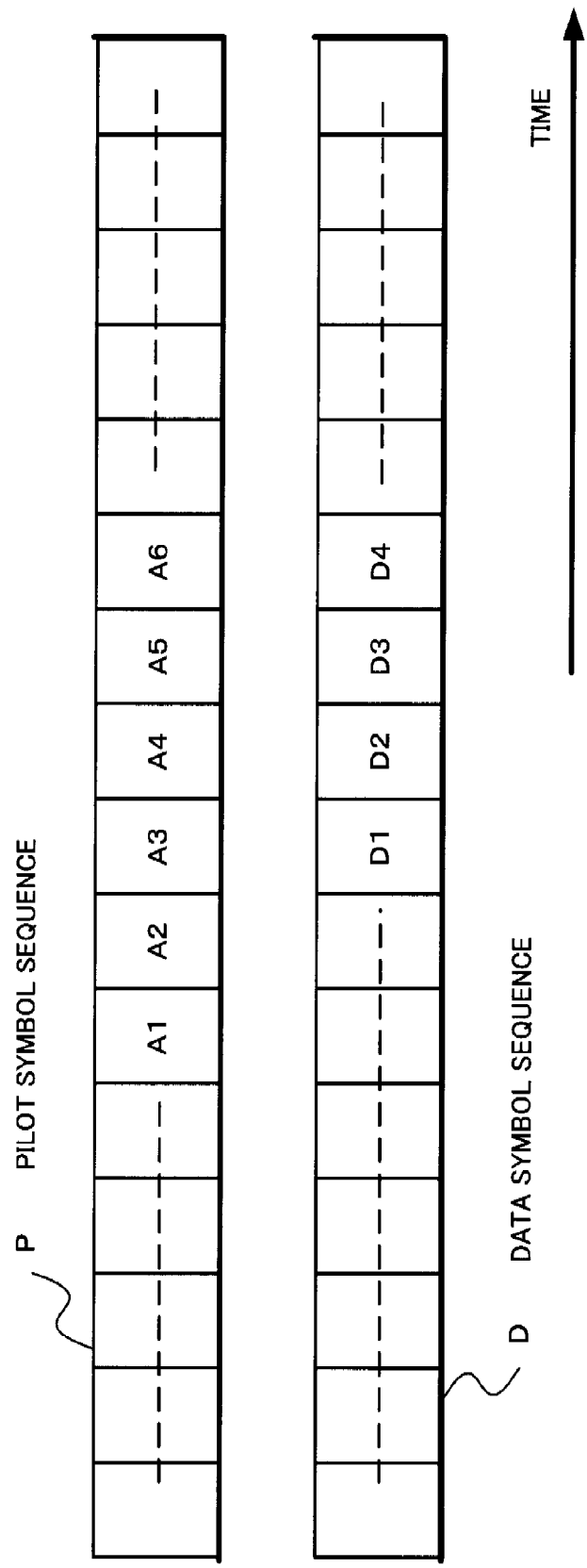
FIG. 1 is a diagram illustrating the parallel scheme of a data symbol and a pilot symbol according to an exemplary embodiment of the present invention.

The exemplary embodiment of a control method of the number of pilot symbols used for channel estimation in response to phasing variation will be described. The present exemplary embodiment uses a parallel scheme shown in FIG. 1 in which a pilot symbol sequence P is inserted in parallel with a data symbol sequence D. Here, each block indicated by . . . A1, A2, A3, A4, A5, A6 . . . in the pilot symbol may be divided as a block containing a plurality of pilot symbols; however, the block may be handled as one pilot symbol. In the following description, a case where the block of the pilot symbol contains one pilot symbol will be described.

In addition, when performing one channel estimation, the mobile radio communication device according to the present exemplary embodiment can detect as targets a maximum of m among the received pilot symbol blocks . . . A1, A2, A3, A4, A5 . . . . By way of example, a value of m may be "5", for example. As described later, when the number of pilot symbol blocks used for channel estimation, which is determined in response to phasing variation, is less than m, a desired pilot symbol block portion can be selected and detected among m pilot symbol blocks. For example, when m is "5", and the number of pilot symbol blocks to be used for channel estimation is determined to be "3", the pilot symbol blocks A2, A3 and A4 used for channel estimation can be selected among the pilot symbol blocks A1 to A5, which are targets. In this manner, the accuracy of channel estimation during rapid phasing variation can be improved.

In addition, according to the present exemplary embodiment, every time a channel estimate is calculated as described later, the number of pilot symbol blocks used then is stored. When the number of pilot symbol blocks used for channel estimation determined in response to phasing variation is equal to or greater than m, one is added to the stored number of pilot symbol blocks with m as the initial value, to increase virtually the number of pilot symbol blocks. When a slow phasing variation state continues, the number of pilot symbol blocks used for channel estimation is gradually virtually increased. In this case, in order to prevent the amount of calculation from increasing, storage is performed after the past channel estimate and number of pilot symbol blocks are overwritten, and, if subsequently a slow phasing variation state further continues, the stored number of pilot symbol blocks and the calculated channel estimate are used for the next calculation. In this manner, the accuracy of channel estimation during slow phasing variation can be improved without increasing the amount of calculation.

In addition, according to the present exemplary embodiment, when the number of pilot symbol blocks used for channel estimation determined in response to phasing variation is less than m, even if m or more numbers of pilot symbols have been stored before then, this is immediately canceled, and a number of pilot symbol blocks for which a new number of pilot symbols used for channel estimation has been determined is adopted. In this manner, although phasing variation rapidly changes from a slow state to a rapid state when a person boards an automobile and starts a ride, for example, the present exemplary embodiment can rapidly respond to such a case.

The present exemplary embodiment will be concretely described below with reference to the drawing.

Figure 2:
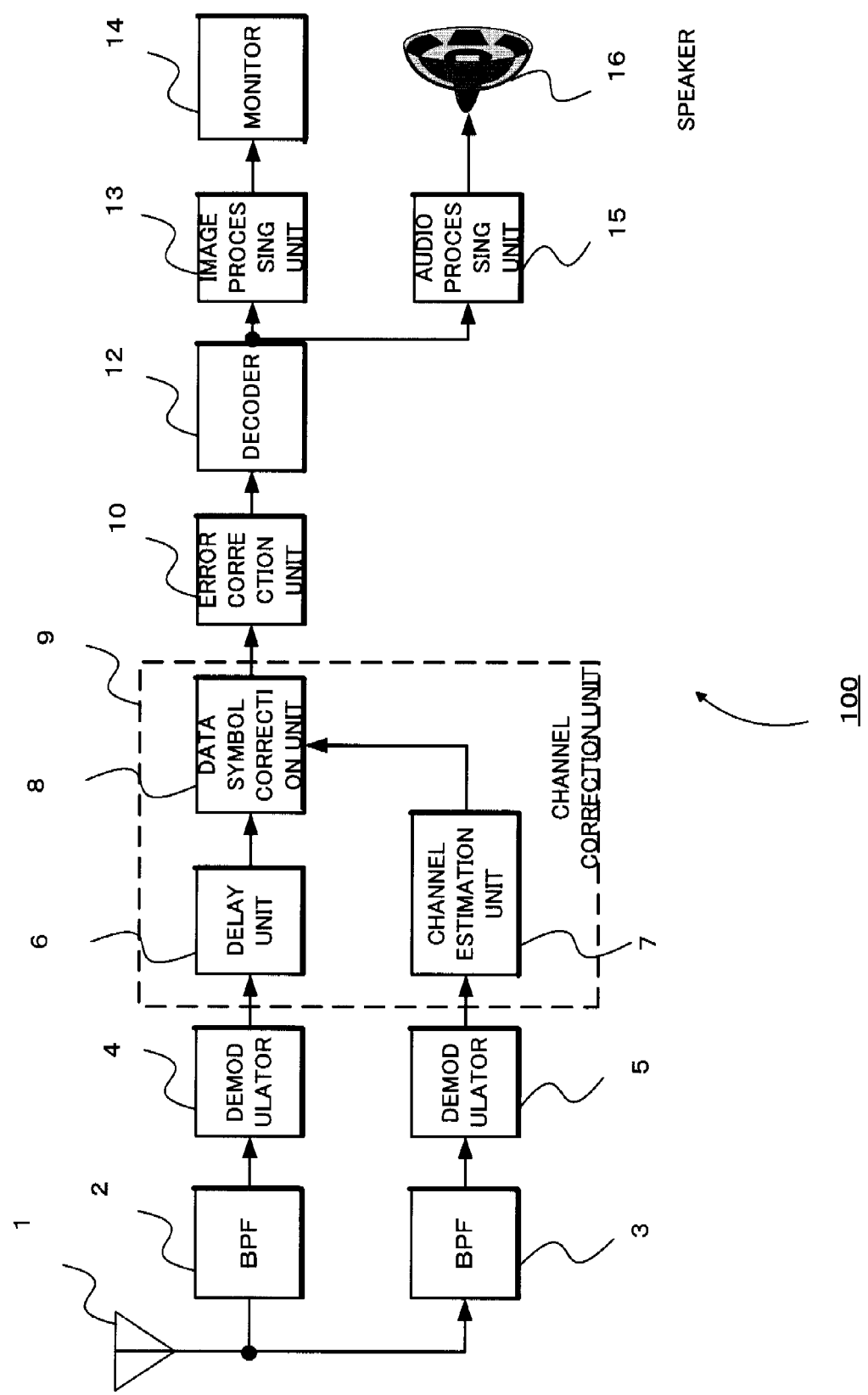
FIG. 2 is a configuration diagram of a control circuit according to the exemplary embodiment of the present invention.

FIG. 2 shows a configuration diagram of a mobile phone 100 as a mobile radio communication device according to the exemplary embodiment of the present invention. However, FIG. 2 shows only the configuration of a receiving circuit, in which the configurations of a sending circuit, a key data input unit or the like are not shown. Further, the mobile phone 100 is controlled using a microcomputer.

Reference numeral 1 denotes a receiving antenna (signal receiving means), which receives signals via radio waves from a station. The signal received by the receiving antenna 1 lets a signal in the frequency band to be received pass through the band-pass filters BPFs (band-pass filtering means) 2 and 3. Reference numerals 4 and 5 denote demodulators (demodulating means), which demodulate the signal modulated by QPSK and 1QAM. The output from the demodulators 4 and 5 are entered into a channel correction unit (channel correction means) 9. The channel correction unit 9 makes corrections so as to reverse the effect of the phase and amplitude of a data symbol received on the propagation path from the station to the mobile phone 100.

An error correction unit (error correction means) 10 performs data error correction on the output signal from the channel correction unit 9.

The output signal from the error correction unit 10 is decoded by the next decoder (decoding means) 12. The decoded image signal is passed through an image processing unit (image processing means) 13, and outputted to a monitor (monitoring means) 14. In addition, a decoded audio signal is passed through an audio processing unit (audio processing means) 15, and outputted to a speaker (audio outputting means) 16.

The channel correction unit 9 comprises a delay unit (data delay unit) 6 for delaying an entered data symbol, a channel estimation unit (channel estimation means) 7 for estimating the state of the propagation path between the station and the mobile phone 100 from the entered pilot symbol, and a data symbol correction unit (data symbol correction means) 8 for correcting the data symbol by the output from the channel estimation unit 7. Since the present exemplary embodiment uses a parallel scheme whereby the pilot symbol sequence P is inserted in parallel with the data symbol sequence D, the signal received from the receiving antenna 1 branches into two channels, the band-pass filters BPFs 2 and 3, and the demodulators 4 and 5, to be entered into the channel correction unit 9. The received data symbol is passed through the band-pass filter BPF 2 and the demodulator 4, and entered into the delay unit 6. In addition, the received pilot symbol is passed through the band-pass filter BPF 3 and the demodulator 5, and entered into the channel estimation unit 7. The data symbol outputted from the delay unit 6 is entered into the data symbol correction unit 8, on the other hand, the channel estimate outputted from the channel estimation unit 7 is entered into the data symbol correction unit 8, and, based on these inputs, the data symbol correction unit 8 corrects the phase and amplitude of the data symbol.

Figure 3:
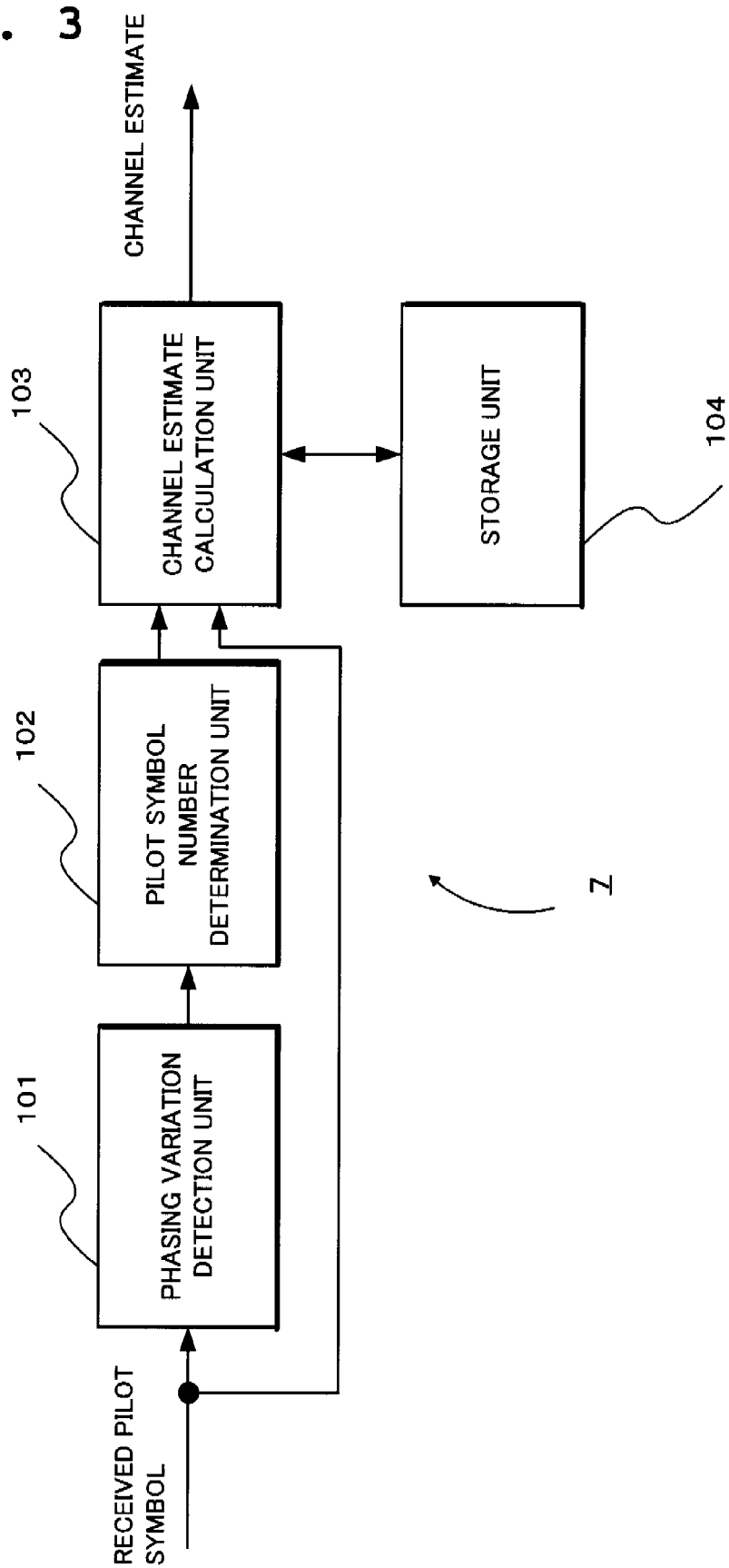
FIG. 3 is a detailed configuration diagram of a channel estimation unit according to the exemplary embodiment of the present invention.

FIG. 3 is a more detailed configuration diagram showing the channel estimation unit 7.

The channel estimation unit 7 comprises a phasing variation detection unit (phasing variation detection means) 101 for detecting phasing variation based on the pilot symbol entered from the demodulator 5, a pilot symbol number determination unit (pilot symbol number determination means) 102 for determining the number of pilot symbol blocks used for channel estimation in response to phasing variation detected by the phasing variation detection unit 101, a channel estimate calculation unit (channel estimate calculation means) 103 for using the number of pilot symbol blocks determined by the pilot symbol number determination unit 102 to calculate a channel estimate, and outputting the channel estimate to the data symbol correction unit 8, and a storage unit (storage means) 104 for storing the channel estimate determined by the channel estimate calculation unit 103 and the number of pilot symbol blocks used then.

Next, the channel estimation according to the present exemplary embodiment will be described with reference to FIGS. 4 and 5.

First, it is assumed that the mobile phone 100 can detect from the pilot symbol blocks . . . A1, A2, A3, A4, A5 . . . , received when channel estimation was calculated, a maximum of five pilot symbol blocks, which are to become targets. In addition, as a distinction between slow phasing and rapid phasing, when the number of pilot symbols detected is "5" or greater, it is called slow phasing, on the other hand, when the number of pilot symbols detected is less than "5", it is called rapid phasing. However, this is only an example of the distinction between the slow phasing and rapid phasing.

In addition, control is performed so that when rapid phasing is detected by the phasing variation detection unit 101, the number of pilot symbol blocks determined by the pilot symbol number determination 102 is, as-is, one to four, and when slow phasing is detected by the phasing variation detection unit 101, the number of pilot symbol blocks used for channel estimation is virtually increased to "5" or greater. Note that the maximum number of pilot symbol blocks, which are to become targets, detected from the received pilot symbols is not limited to five, as described above.

Figure 4:
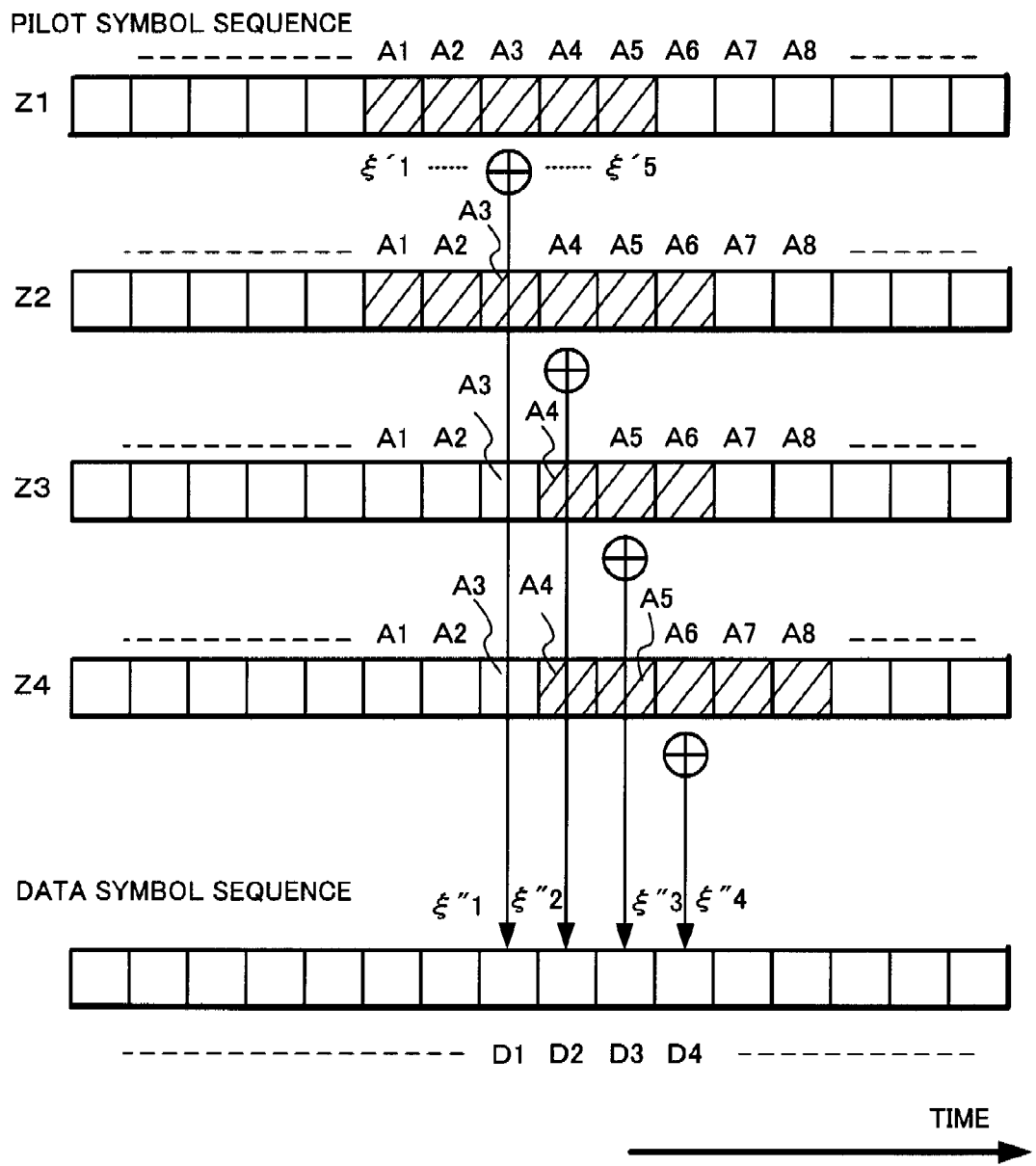
FIG. 4 is a diagram illustrating channel estimation according to the exemplary embodiment of the present invention.

FIG. 4 illustrates the operation whereby, in the data symbol sequence D and the pilot symbol sequence A in FIG. 1, the pilot symbol blocks . . . A1, A2 . . . are multiplied by a complex conjugate P* of a known pilot symbol (sent pilot symbol) P to determine each channel estimate $\xi'$ of the pilot symbol $\xi$, and determine the average value $\xi''$ of the channel estimates $\xi'$, and the data symbol is corrected based on the determined average value $\xi''$. Here, Z1, Z2, Z3 and Z4 show the pilot symbol sequence P at each time point of one channel estimation calculation. That is to say, Z1 shows the state of the pilot symbol sequence at the time of first channel estimation, Z2 shows the state of the pilot symbol sequence at the time of second channel estimation, . . . , and Z4 shows the state of the pilot symbol sequence at the time of fourth channel estimation.

In Z1, Z2, Z3 and Z4, the pilot symbols used for channel estimation are shown by shaded areas. In the example shown in FIG. 4, the changes occur in a manner such as, five pilot symbol blocks A1 to A5 in the shaded area are used (target pilot symbol blocks are A1 to A5) in Z1, six pilot symbol blocks A1 to A6 in the shaded area are used (target pilot symbol blocks are A2 to A6) in the subsequent Z2, three pilot symbol blocks A4 to A6 in the shaded area are used (target pilot symbol blocks are A3 to A7) in the subsequent Z3, and so on. In this manner, the state of the number of pilot symbol blocks used for channel estimation changes. At that time, the number of the target pilot symbol blocks is "5", which is shifted one block by one block every time channel estimation calculation is performed.

Then, Z1 shows an initial state at which the calculation of channel estimation started, the initial value of the number of pilot symbol blocks being "5".

In addition, since the mobile phone 100 can detect from the pilot symbol blocks . . . A1, A2, A3, A4, A5 . . . used for channel estimation, a maximum of five pilot symbol blocks, which are to become targets, all of the pilot symbol blocks A1 to A5 are sampled from the received data. At this time, when slow phasing (the number of pilot symbols used for channel estimation is "5" or greater) is detected, the number of pilot symbol blocks is determined to be "5", and the number of pilot symbol blocks "5" is used to perform channel estimation calculation. Then, each channel estimate $\xi'1$ to v'5 of the pilot symbol blocks A1 to A5 constituted by a plurality of pilot symbols each containing En blocks is determined, and the average value $\xi1''$ of all the pilot symbol blocks A1 to A5 is determined from the average values $\xi'1$ to $\xi'5$ of the channel estimates, then the data symbol D1 is corrected based on the average value $\xi1''$. This aspect is indicated by arrows extending from the pilot symbol sequence Z1 to the data symbol sequence D1 in FIG. 4.

In the subsequent Z2, a state is shown where slow phasing was determined (the number of pilot symbols used for channel estimation is "5" or greater) following the state in Z1.

Since the upper limit for the maximum number of blocks that can be detected as targets from the received pilot symbol is "5", in the present exemplary embodiment, as described later, the stored values of the received pilot symbols A1 to A5 previously determined in Z1 and a new A6 are used to virtually set the pilot symbol block to "6". Then the six received pilot symbol blocks A1 to A6 in Z2 determined in an equivalent manner are used to determine the average value of the channel estimates, and the data symbol D2 is corrected based on the average value $\xi2''$ of the determined pilot symbols.

The subsequent Z3 shows a state where rapid phasing is detected from the slow phasing state in Z2, and the number of pilot symbol blocks is, as-is, the value determined by the pilot symbol number determination unit 102 after the value during the slow phasing state is canceled. Here, an example where the number of pilot symbol blocks is determined to be "3", is shown, and the three received pilot symbols A4 to A6 are used to calculate the average value of the channel estimates (target pilot symbol blocks are A3 to A7). Then the data symbol D3 is corrected based on the average value $\xi3''$ of the channel estimation determined from the pilot symbol blocks A4 to A6.

The subsequent Z4 shows a state where slow phasing has been detected from a rapid phasing state in Z3, where the number of pilot symbol blocks is determined to be "5", which is the maximum number of blocks that can be sampled from the received pilot symbols. In this case, the five received pilot symbols A4 to A8 are used to calculate the average value of the channel estimates (target pilot symbol blocks are A4 to A8). Then the data symbol D4 is corrected based on the average value $\xi4''$ of the channel estimation determined from the pilot symbol blocks A4 to A8.

Hereinafter, the operation is similar.

Figure 5:
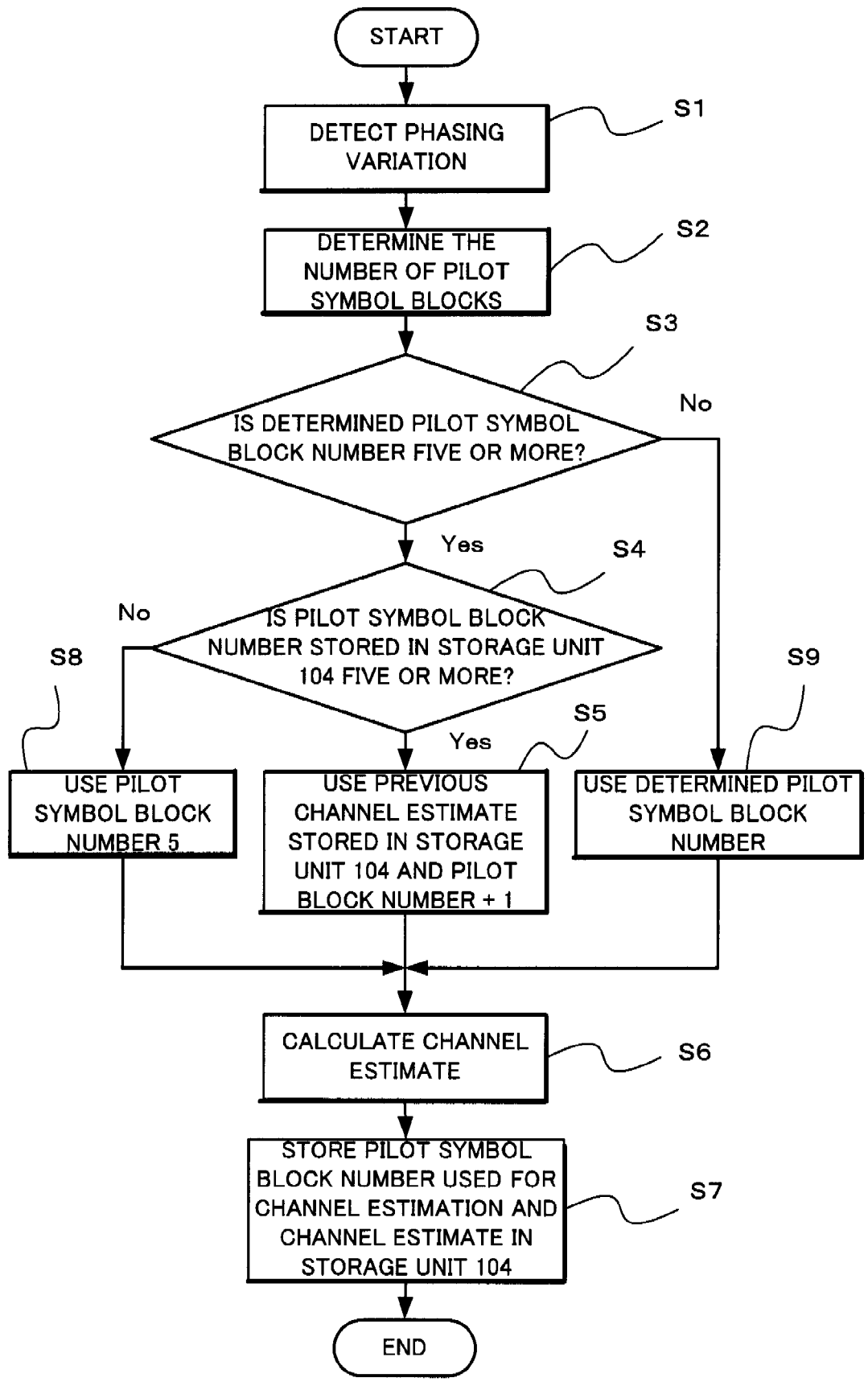
FIG. 5 is a control flowchart of channel estimation according to the exemplary embodiment of the present invention.

FIG. 5 is a flowchart showing the control of channel estimation due to phasing variation. A more detailed description will be provided with reference to FIG. 5.

As the present exemplary embodiment, an example will be described where phasing variation is detected by determining the inner product of the normalized average value of the pilot symbols in Step S1.

Figure 6:
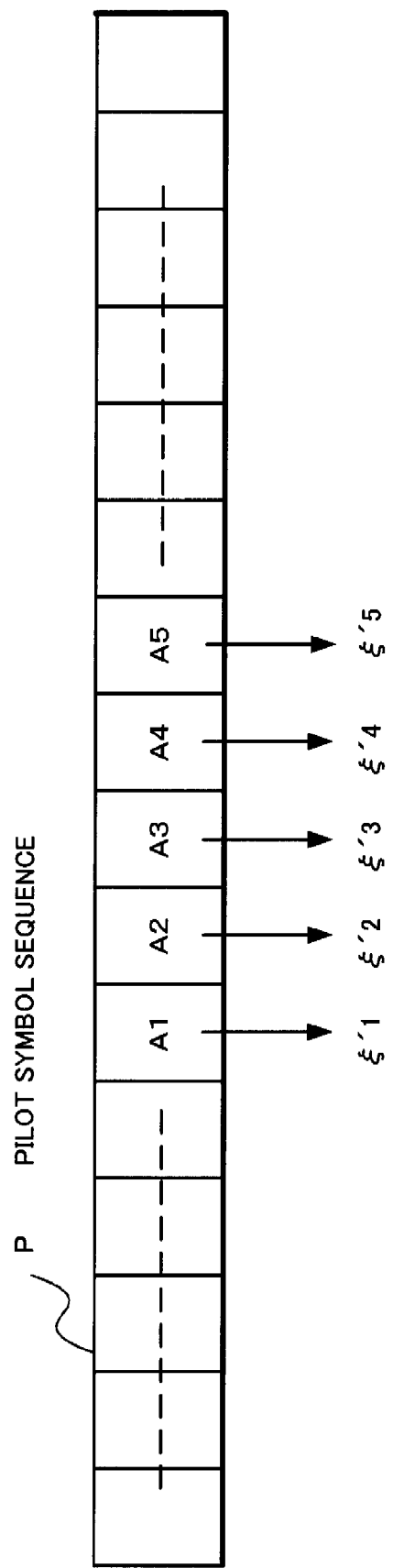
FIG. 6 is a diagram illustrating the detection of phasing variation according to the exemplary embodiment of the present invention.
Figure 7:
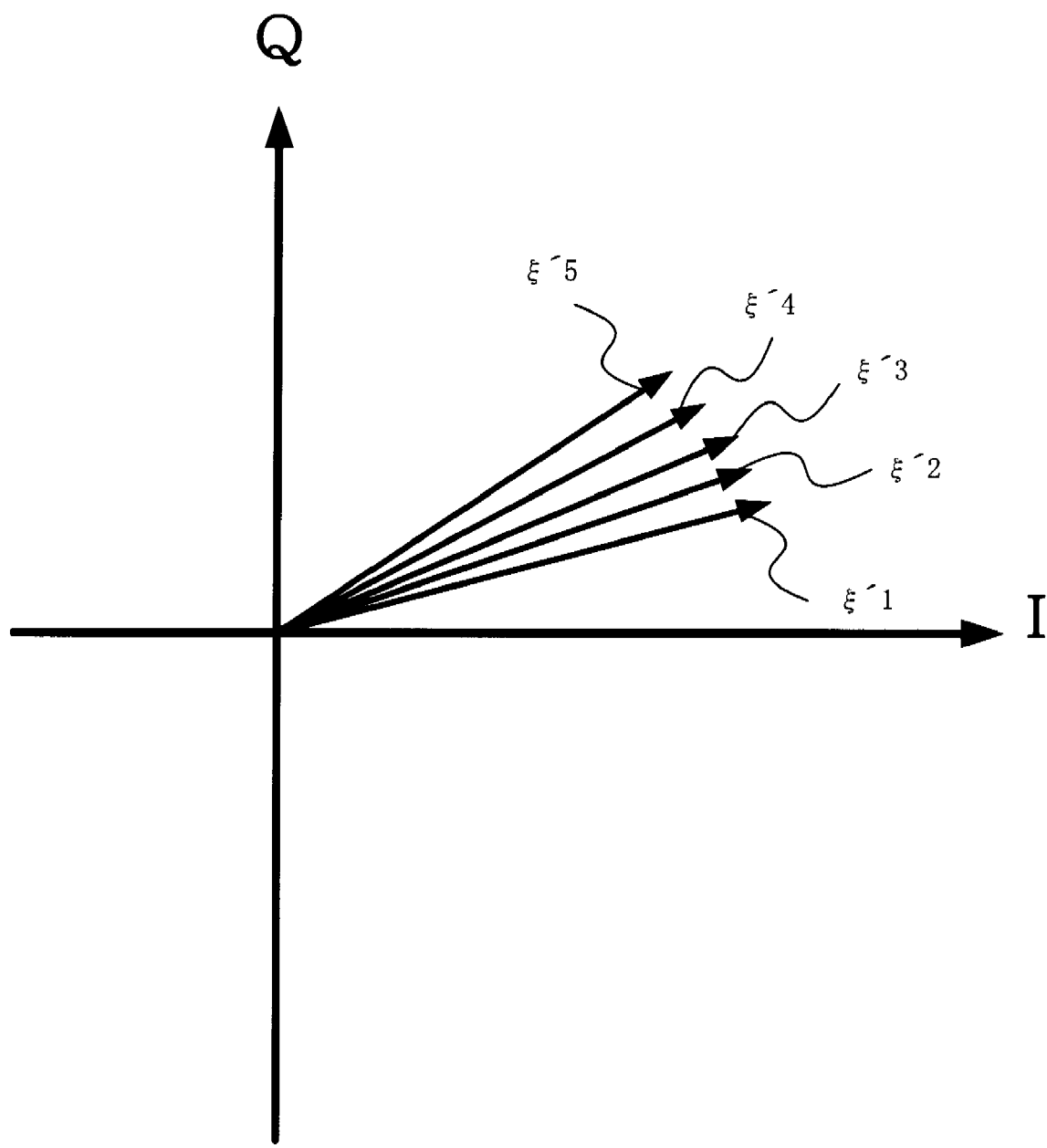
FIG. 7 is a diagram illustrating the detection of phasing variation according to the exemplary embodiment of the present invention.
Figure 8:
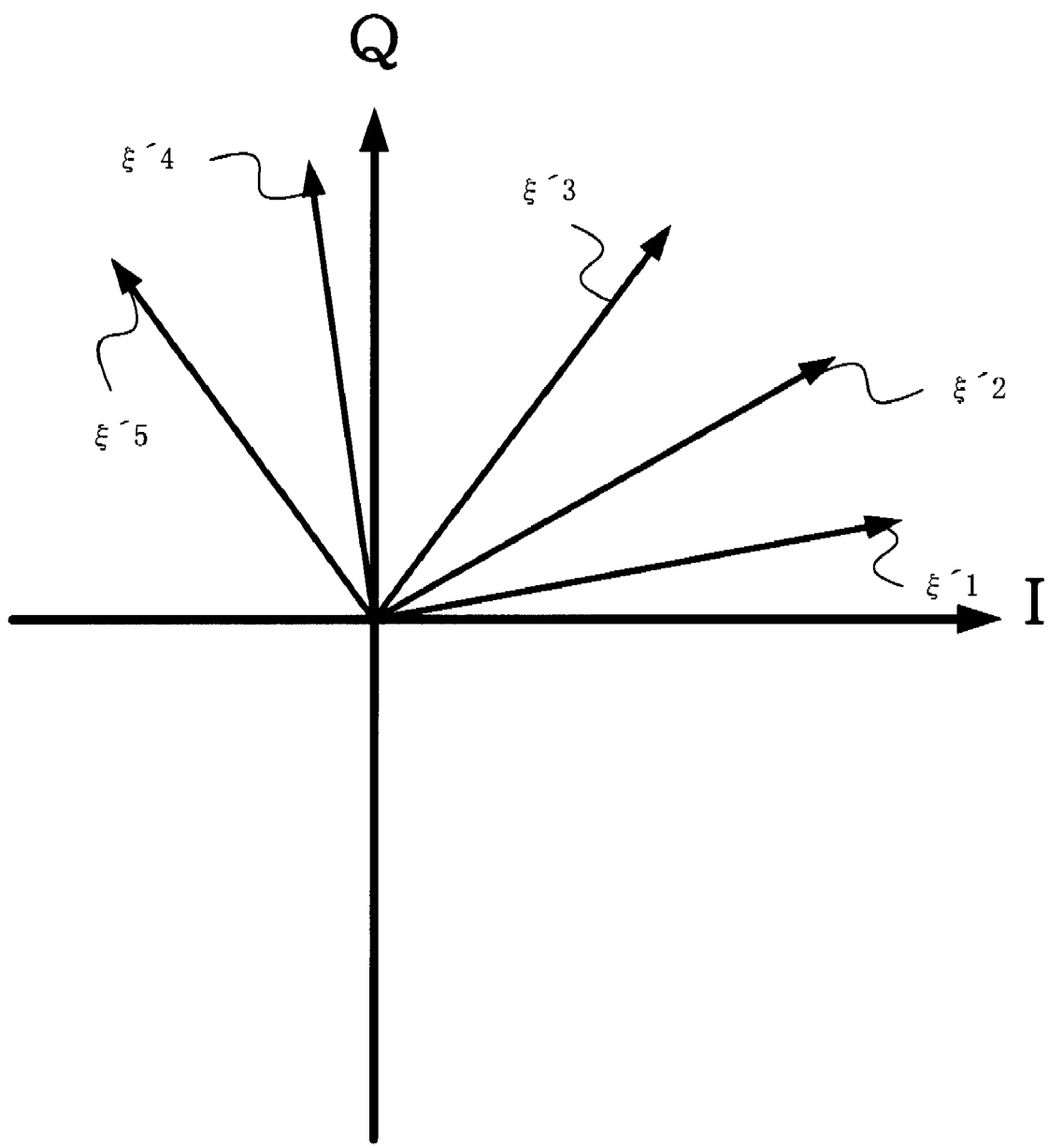
FIG. 8 is a diagram illustrating the detection of phasing variation according to the exemplary embodiment of the present invention.

First, in Step S1, the normalized inner product value of the pilot symbols is outputted as a phasing variation detection value. The above mentioned inner product value is determined based on the sizes of the phase and the amplitude among pilot symbol blocks detected as targets. For slow phasing, mutual correlation is large and the inner product becomes large, and for rapid phasing, mutual correlation is small and the inner product becomes small. FIGS. 6 to 8 show the aspect of changes in inner product values with changes in pilot symbols. Relationships shown in FIGS. 7 and 8 can be drawn from the average values $\xi'1$ to $\xi'5$ detected from the pilot symbols shown in FIG. 6. However, $\xi'1$ to $\xi'5$ are standardized, then detected. Since FIG. 7 shows slow phasing variation, $\xi'1$ to $\xi'5$ little change. On the contrary, since FIG. 8 shows rapid phasing variation, the phases of $\xi'1$ to $\xi'5$ considerably change. It is clear that these inner product values $\xi'1$ to $\xi'5$ become larger than those of $\xi'1$ to $\xi'5$ in the relationship in FIG. 8 with respect to the inner product values $\xi'1$ to $\xi'5$ in the relationship of FIG. 7. Therefore, the inner product values can be used to evaluate phasing variation.

More specifically, this detection of phasing variation is performed by the phasing variation detection unit 101. Pilot symbols are entered into the phasing variation detection unit 101, and the pilot symbols are averaged, normalized, and detected as average values $\xi'1$ to $\xi'5$. The inner product of the normalized average value of two temporally successive pilot symbols is determined. That is to say, the inner products of $\xi'1$ and $\xi'2$, $\xi'2$ and $\xi'3$, $\xi'3$ and $\xi'4$, and $\xi'4$ and $\xi'5$ are calculated, and these inner products are averaged, then the averaged inner product value $\xi'1$ is outputted as a phasing variation detection value. Note that the number of pilot symbol blocks to be sampled (the number of target pilot symbol blocks) to detect the size of the phasing variation does not have to match the number of pilot symbol blocks used to calculate a channel estimate, and may be equal to or less than the maximum number of pilot symbol blocks that can be detected of "5".

Figure 9:
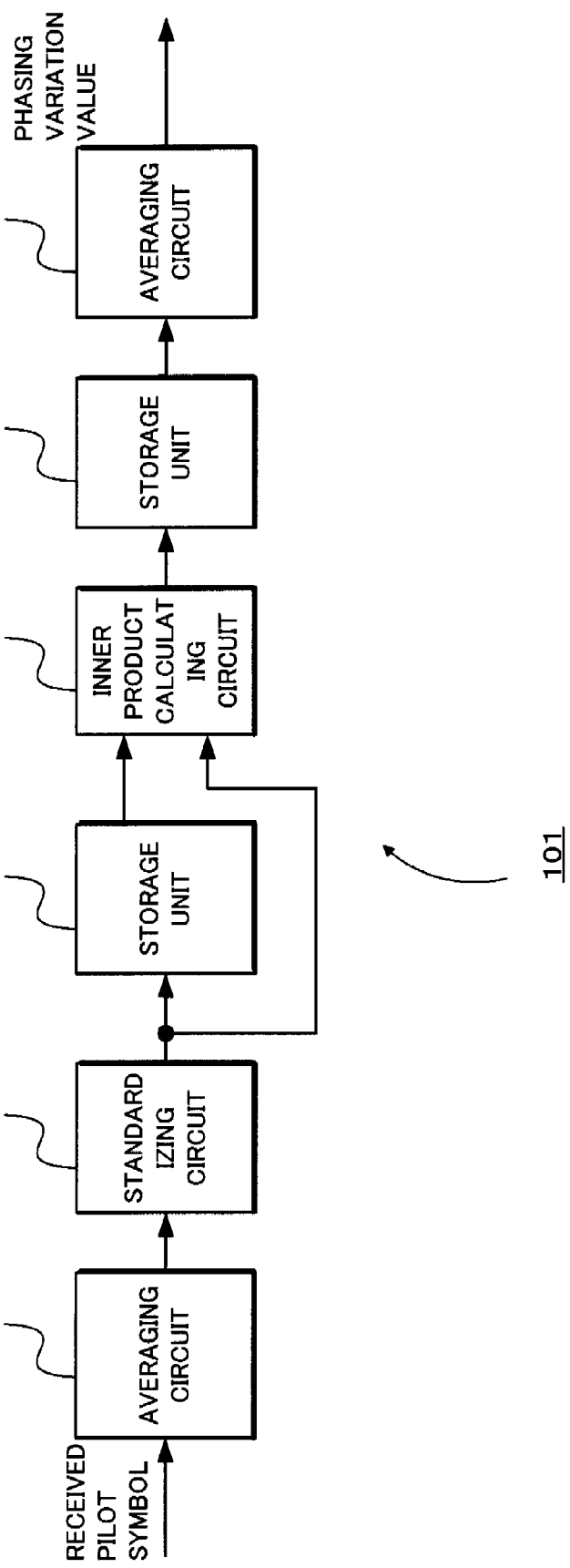
FIG. 9 is a detailed configuration diagram of a phasing variation detection unit according to the exemplary embodiment of the present invention.
Figure 10:
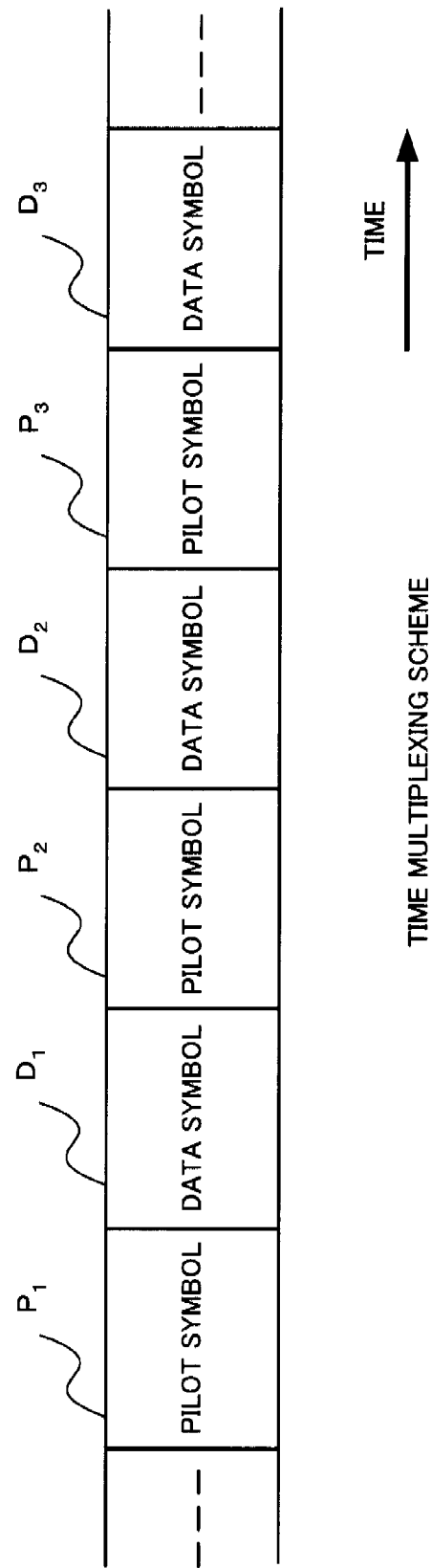
FIG. 10 is a diagram illustrating a related time multiplexing scheme of a data symbol and a pilot symbol.
Figure 11:
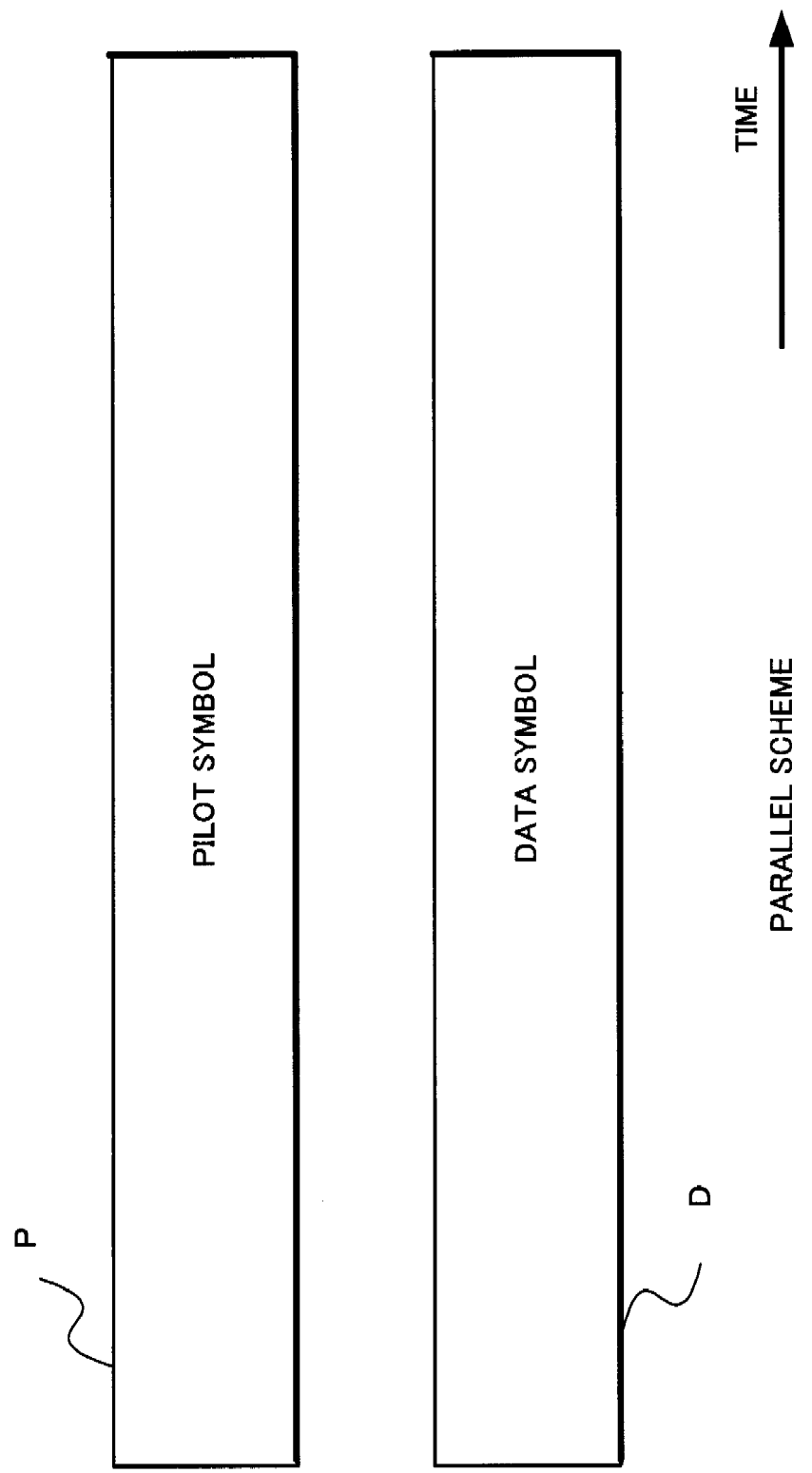
FIG. 11 is a diagram illustrating a related parallel scheme of a data symbol and a pilot symbol.

FIG. 9 shows the detailed configuration of the phasing variation detection unit 101 for determining an inner product value from the detected pilot symbols, and detecting the size of the phasing variation. The received pilot symbols A1 to A5 are detected and entered.

First, a plurality of pilot symbols contained in the pilot symbol A1 entered into the phasing variation detection unit 101 are averaged by an averaging circuit (averaging means)

201, and standardized by a standardizing circuit (standardizing means) 202. The standardized value ξ'1 is temporarily stored in a storage unit (storage means) 203. Next, a plurality of pilot symbols contained in the pilot symbol A2 entered into the phasing variation detection unit 101 are averaged by the averaging circuit 201, and standardized by the standardizing circuit 202. The standardized value ξ'2 is temporarily stored in the storage unit 203.

Next, the inner product value between the standardized average value ξ'1 of the pilot symbols A1, which was previously determined and stored in the storage unit 203, and the standardized average value ξ'2 of the pilot symbols A2, which is determined this time, is determined by an inner product calculating circuit (inner product calculation means) 204, and stored in a storage unit (storage means) 205.

Next, similarly, a plurality of pilot symbols contained in the pilot symbol A3 entered into the phasing variation detection unit 101 are averaged by the averaging circuit 201, and standardized by the standardizing circuit 202. The standardized value ξ'3 is temporarily stored in the storage unit 203. Next, the inner product value between the standardized average value ξ'2 of the pilot symbols A2, which was previously determined and stored in the storage unit 203, and the standardized average value ξ'3 of the pilot symbols A3, which is determined this time, is determined by the inner product calculating circuit 204, and stored in the storage unit 205.

In this manner, four inner product values ξ'1 to ξ'4 of pilot symbols A1 to A5 entered into the phasing variation detection unit 101 are stored in the storage unit 205. The averaging circuit 206 determines the average of the inner product values based on the four inner product values ξ'1 to ξ'4 stored in the storage unit 205, and outputs the average to the pilot symbol number determination unit 102.

Note that, if update is performed in the next round of phasing variation detection so as to sample the pilot symbol block A6 and discard the pilot symbol block A1 for which time elapsed most, then the averaged inner product value of the next updated phasing variation can be determined. In this manner, the averaged inner product value of the phasing variation is sequentially updated.

In addition, although, in this example, the pilot symbols A1 to A5 are used to determine the average value of four inner product values ξ'1 to ξ'4, the present invention is not limited thereto. For example, A2 to A4 may be used to determine the average value of the two inner product values.

When the inner product value for which the pilot symbols are normalized and averaged is outputted as a phasing variation detection value in Step S1, the number of pilot symbols is determined based on the phasing variation detection value in Step S2. More specifically, for example, the number of pilot symbol blocks, which corresponds to the phasing variation detection value, is stored in advance in the pilot symbol number determination unit 102 so as to correspond to the above mentioned inner product value, and the number of pilot symbol blocks corresponding to the inner product value (phasing variation value) entered from the phasing variation detection unit 101 is selected and outputted.

An example of the correspondence between the inner product value (phasing variation detection value) and the number of pilot symbols, which are stored in the pilot symbol number determination unit 102, is as follows:

inner product value>0.3 . . . the number of pilot symbol blocks is "5" or greater
0.3□ inner product value>0.2 . . . the number of pilot symbol blocks is "4"
0.2□ inner product value>0.1 . . . the number of pilot symbol blocks is "3"
0.1□ inner product value . . . the number of pilot symbol blocks is "2"

Needless to say, this correspondence between the inner product value and the number of pilot symbol blocks is only an example, and correspondences other than this example may be possible. In this example, the number of pilot symbol blocks is two or greater.

If a slow phasing state continues in which the inner product exceeds "0.3", the number of pilot symbols used for channel estimation increases with the initial value of "5".

In Step S3, whether or not the number of pilot symbol blocks, which was determined in Step S2, is "5" or greater is determined. If NO (less than "5"), the phasing variation is determined to be sharp, and the process proceeds to Step S9, where the number of pilot symbol blocks determined in Step S2 is determined to be used for channel estimation.

When the number of the pilot symbol blocks is determined in Step S9, the process proceeds to Step S6, where the determined number of pilot symbol blocks is used by the channel estimate calculation unit 103 to calculate a channel estimate. The calculation of the channel estimate in this case will be described later as <case 3> with reference to FIG. 4. Next, the process proceeds to Step S7, where the number of pilot symbol blocks used in Step S6 and the channel estimate determined this time are stored in the storage unit 104. The number of pilot symbol blocks and the channel estimate stored in the storage unit 104 are stored so as to overwrite and update the previous values.

In Step S3, if YES ("5" or greater), the phasing variation is determined to be slow, and the process proceeds to Step S4. In Step S4, whether or not the previous number of the pilot symbol blocks stored in the storage unit 104 is "5" or greater is checked. That is to say, for slow phasing, the previous number of the pilot symbols stored in the storage unit 104 is "5" or greater. Accordingly, in Step S4, when the previous number of the pilot symbols stored in the storage unit 104 is referenced and is "5" or greater, the process proceeds to Step S5, where the value, which is the value stored in the storage unit 104 increased by one number of pilot symbol blocks, is determined to be the number of pilot symbol blocks used for channel estimation.

When the number of the pilot symbol blocks is determined in Step S5, the process proceeds to Step S6, where the determined number of pilot symbol blocks is used by the channel estimate calculation unit 103 to calculate a channel estimate. The calculation of the channel estimate in this case will be described later as <case 2> with reference to FIG. 4. In this case, the previous channel estimate stored in the storage unit 104 is used to determine a new channel estimate.

After the channel estimate is determined in Step S6, the process proceeds to Step S7, where the number of pilot symbol blocks used in Step S6 and the channel estimate determined this time are stored in the storage unit 104. The number of pilot symbol blocks and the channel estimate stored in the storage unit 104 are stored so as to overwrite and update the previous values.

When the previous number of pilot symbol blocks stored in the storage unit 104 is less than "5" in Step S4, the process proceeds to Step S8, where the number of pilot symbol blocks is determined. Since this step is a step gone through when the rapid phasing changes to slow phasing in Step 8, the number of pilot symbol blocks in this case is determined to be "5", which is an initial value.

When the number of the pilot symbol blocks is determined in Step S8, the process proceeds to Step S6, where the determined number of pilot symbol blocks "5" is used by the channel estimate calculation unit 103 to calculate a channel estimate. The calculation of the channel estimate in this case will be described later as <case 1> and <case 4> with reference to FIG. 4.

Next, the process proceeds to Step S7, where the number of pilot symbol blocks used in Step S8 and the channel estimate determined this time are stored in the storage unit 104. The number of pilot symbol blocks and the channel estimate stored in the storage unit 104 are stored so as to overwrite and update the previous values.

Next, the operation of calculation of a channel estimate according to the present exemplary embodiment will be described in details using the example of FIG. 4. In FIG. 4, a case where the initial maximum value of the number of pilot symbol blocks used for channel estimation is "5" is described as an example. That is to say, the initial value(*) of the number of pilot symbol blocks to start calculation is set to "5" as a default value. In addition, a maximum of five pilot symbol blocks can be sampled from a received signal every time channel estimation calculation is performed. That is to say, the maximum value of the targets of the pilot symbol blocks is "5".

<First Case>

First, when the phasing variation detection unit 101 initially detects that phasing variation is slow from the five received pilot symbols A1 to A5, the number of pilot symbol blocks, which can be detected as targets from the received signal, cannot exceed the initial maximum value "25", therefore, the pilot symbol number determination unit 102 determines that the number of the pilot symbol blocks used for calculation of a channel estimate is five, which is set as a default value. That is to say, the received pilot symbols A1 to A5 in the pilot symbol sequence Z1 are used.

In this case, letting a channel estimate being $\xi''1$, the channel estimate calculation unit 103 determines the channel estimate $\xi''1$ as $$\xi''1=(A_1P^*+A_2P^*+A_3P^*+A_4P^*+A_5P^*)/5 \quad (1)$$

where P* is a complex conjugate of the known pilot symbol P.

The determined $\xi''1$ is entered into the data symbol correction unit 8 from the channel estimate calculation unit 103, and the data symbol correction unit 8 applies the channel estimate $\xi''1$ to the block D1 in the data symbol sequence and corrects the data symbol in the data symbol block D1.

The channel estimate $\xi''1$ and the number of pilot symbols "5" used to determine the channel estimate $\xi''1$ are stored in the storage unit 104 after overwriting.

Note that this <case 1> is an operational flow having a route of steps S1->S2->S3->S4->S8->S6->S7 in FIG. 5.

<Second Case>

In order to determine the subsequent channel estimate $\xi''2$, phasing variation is detected by the phasing variation detection unit 101 from the received pilot symbols A2 to A6, which are to become five targets received in a similar fashion. As a result, when detection is of slow phasing variation, a slow state has been continuing, such that the pilot symbol number determination unit 102 determines the number of pilot symbol blocks as "6" by adding "1" to the number of the previous pilot symbols "5". The pilot symbol sequence Z2 indicates this state, and the channel estimate calculation unit 103 calculates a channel estimate using six pilot symbol blocks A1 to A6.

During calculation of the channel estimate, a maximum of five pilot symbol blocks can be detected from the received signal, but six pilot symbols cannot be detected from the received data. Accordingly, the channel estimate $\xi''1$, which is previously determined from the pilot symbol sequence Z1 and stored in the storage unit 104, and the number of pilot symbol blocks, which was used to determine the channel estimate $\xi''1$, are used.

That is to say, letting the average value of the pilot symbol A6 being $\xi 6$, and a channel estimate determined this time being $\xi''2$, the channel estimate calculation unit 103 determines the channel estimate $\xi''2$ as $$\xi''2=(\xi''1\times 5+A_6P^*)/6 \quad (2)$$

As seen from the expressions (1) and (2), this is the same as $$\xi''2=(A_1P^*+A_2P^*+A_3P^*+A_4P^*+A_5P^*+A_6P^*)/6 \quad (3)$$

which means that the channel estimate is calculated using six received pilot symbol blocks A1 to A6, in an equivalent manner.

The determined $\xi''2$ is entered into the data symbol correction unit 8 from the channel estimate calculation unit 103, and the data symbol correction unit 8 applies the channel estimate $\xi''2$ to the block D2 in the data symbol sequence and corrects the data symbol in the data symbol block D2.

The channel estimate $\xi''2$ and the number of pilot symbol blocks "6" used to determine the channel estimate $\xi''2$ are stored in the storage unit 104 after overwriting.

Hereinafter, if slow phasing variation continues, the third and subsequent calculations are expressed as $$\xi''3=(A_1P^*+A_2P^*+A_3P^*+A_4P^*+A_5P^*+A_6P^*+A_7P^*)/7 \quad (4)$$

$$=(\xi''2\times 6+A_7P^*)/7 \quad (5)$$

however, the nth calculation $$\xi''n=(A_1P^*+A_2P^*+A_3P^*+A_4P^*+A_5P^*+A_6P^*+\ldots+A_{n+4}P^*)/(n+4) \quad (6)$$

can be calculated as $$\xi''n=(\xi''n-1\times(n+3)+A_{n+4}P^*)/(n+4) \quad (7)$$

using the n−1th channel estimate $\xi''n-1$, which is stored in the storage unit 104 after overwriting, the n−1th number of pilot symbols n+3, and $A_{n+4}P^*$ newly determined from the received pilot symbol block An+4.

At the nth calculation, the channel estimate is calculated using n+4 received pilot symbol blocks A1 to An+4, in an equivalent manner. In this manner, when slow phasing variation continues, the number of the pilot symbols increases in an equivalent manner.

In addition, generalizing further the expression (7), where n is an arbitrary integer and m is the maximum number of pilot symbol blocks that can be received, when a slow state of pre-divided phasing variation is detected continuously, 1 is added to the stored number of pilot symbol blocks to serve as the new number of pilot symbol blocks, and the nth channel estimate $\xi''n$ can be calculated as $$\xi''n=(\xi''n-1\times(m+n-2)+\xi'm+n-1)/(m+n-1)$$

$$\xi''n=(\xi''n-1\times(m+n-2)+A_{m+n-1}P^*)/(m+n-1) \quad (8)$$

where m+n−1 is the number of pilot symbol blocks when the slow state of the phasing variation is detected continuously n times, $\xi''n-1$ is a channel estimate when the slow state of the phasing variation is detected continuously n−1 times, m+n−2 is the number of pilot symbol blocks when the slow state of the phasing variation is detected continuously n−1 times, and $\xi'n+4$ is the average value of the pilot symbols, which is newly determined when the slow state of the phasing variation is detected continuously n times.

It is considered that with the above mentioned channel estimation, slow phasing variation continues if the mobile phone (mobile radio communication device) 100 remains in the same place, thus allowing channel estimation to be performed with high accuracy.

Note that this <case 2> is an operational flow having a route of steps S1->S2->S3->S4->S5->S6->S7 in FIG. 5.

<Third Case>

In the example of FIG. 4, it is assumed that rapid phasing variation is detected in the next Z3.

In order to determine the channel estimate $\xi''3$, phasing variation is detected by the phasing variation detection unit 101 from the received pilot symbol blocks A3 to A7, which are to become five targets received in a similar fashion. As a result, when detection is of sharp phasing variation, in order to prevent the channel estimate from being degraded, the channel estimate $\xi''2$, which was previously determined and stored in the storage unit 104, and the number of pilot symbols "6", which was used to determine the channel estimate $\xi''2$, are not used. In this case, the number of pilot symbols which is less than "5" determined at the pilot symbol number determination unit 102 is immediately adopted.

Since the phasing of the pilot symbol sequence Z3 at this time is rapid, if the number of pilot symbols "3/" is detected by the phasing variation detection unit 101, the channel estimate calculation unit 103 calculates a channel estimate $\xi''3$ as $$\xi''3=(A_4P^*+A_5P^*+A_6P^*)/3 \qquad (9)$$

The determined $\xi''3$ is entered into the data symbol correction unit 8 from the channel estimate calculation unit 103, and the data symbol correction unit 8 applies the channel estimate $\xi''3$ to the block D3 in the data symbol sequence and corrects the data symbol in the data symbol block D3.

Since, when a change occurs from slow phasing variation to rapid phasing variation as described above, the number of pilot symbol blocks used for channel estimation and the channel estimate are not used for the next channel estimation calculation, these values may be stored in the storage unit 104 after overwriting, but the channel estimate stored in the storage unit 104 and the number of pilot symbol blocks may be cleared. Alternatively, a specific value, which indicates rapid phasing variation, may be stored.

As can be seen from this calculation method, when phasing variation changes from a slow state to a rapid state, this change can be handled immediately. For example, when a person boards an automobile and starts a ride, for example, the present exemplary embodiment can rapidly respond to such a case.

Note that this <case 3> is an operational flow having a route of steps S1->S2->S3->S9->S6->S7 in FIG. 5.

<Fourth Case>

In order to determine the subsequent channel estimate $\xi''4$, phasing variation is detected by the phasing variation detection unit 101 from the pilot symbol blocks A4 to A8, which are to become five targets received in a similar fashion. As a result, when detection is of slow phasing variation, since the phasing variation changes from a rapid state to a slow state, the pilot symbol number determination unit 102 determines the number of pilot symbol blocks as "S", which is set as a default value.

At this time, letting the average values of the pilot symbol blocks A7 and A8 being $\xi'7$ and $\xi'8$, and a channel estimate being $\xi''4$, the channel estimate calculation unit 103 calculates the channel estimate value $\xi''4$ as $$\xi''4=(A_4P^*+A_5P^*+A_6P^*+A_7P^*+A_8P^*)/5 \qquad (10)$$

Note that the operation of this <case 4> is the same as that of <case 1>. Note that this <case 4> is an operational flow having a route of steps S1->S2->S3->S4->S8->S6->S7 in FIG. 5.

Although <case 1> to <case 4> have been described until now, hereinafter, the description is omitted because the operation is the same as that described in the Z1 sequence.

As described above, in a slow phasing environment, the number of pilot symbol blocks used for channel estimation can be increased to improve the accuracy of channel estimation.

In addition, in a rapid phasing environment, the accuracy of channel estimation can be improved without determining a weighting factor to calculate weighing as in the related art.

Although, in the above description, five pilot symbol blocks are used as an initial maximum value, this example is only an example, and any number of pilot symbol blocks can be applied.

(Another Example of Detecting Phasing Variation)

Although the above mentioned phasing detection unit determines an inner product value between pilot symbols to detect phasing variation, as another example of detecting phasing variation, the velocity of the mobile phone (mobile radio communication device) 100 is detected to evaluate the size of the phasing variation. In this case, the phasing variation detection unit 101 in FIG. 3 may be replaced with a circuit 101' for detecting the velocity of the mobile phone 100.

In this case, the phasing variation detection unit 101' outputs a value corresponding to a normalized Doppler frequency fdTs, and, based on the output, the pilot symbol block number determination unit 102 performs determination as follows, for example.

0.5□ fdTs<1 . . . the number of pilot symbol blocks is two
0.1□ fdts<0.5 . . . the number of pilot symbol blocks is three
0.01□ fdTs<0.1 . . . the number of pilot symbol blocks is four
fdTs<0.01 . . . the number of pilot symbol blocks is five or greater where fd is a Doppler frequency, and Ts is one symbol timing. fd is expressed as fd=v/λ where v is the velocity of the mobile phone 100 and λ is the wavelength of a carrier wave.

In addition, for detection of velocity, a velocity detection device using a Global Positioning System (GPS) is known and may be used. That is to say, radio waves are received from a plurality of GPS satellites to detect a current position, and a difference between the current position and the current position after a lapse of predetermined time is used to detect velocity.

Note that, although a case where there is one pilot symbol in a pilot symbol block has been described in the above mentioned exemplary embodiment, the present invention can also be applied to a case where there are a plurality of pilot symbols in a pilot symbol block.

Although a concrete exemplary embodiment has been described, a circuit related to the above mentioned channel correction calculation can be manufactured as a semiconductor apparatus having a radio communication function (semiconductor device having a radio communication function) constructed in one chip, such as an IC; thus such a circuit can be provided as an inexpensive part to each field of application. In this case, how to partition the circuit related to channel correction calculation and form it in one chip can be selected as appropriate. Needless to say, the present invention is not limited to the above mentioned exemplary embodiment, and may be changed and implemented as appropriate without departing from the scope of the present invention.

In the present invention, even if the number of pilot symbols that can be detected is limited, when slow phasing is detected continuously, there is an effect of increasing virtually the number of pilot symbols used for channel estimation beyond the above mentioned upper limit to increase the accuracy of channel estimation.

In addition, when a change occurs from slow phasing to rapid phasing, channel estimation is performed by determining the number of pilot symbols used for channel estimation on the state of the rapid phasing variation detected this time regardless of whether the previously detected phasing variation was slow or rapid, such that rapid phasing variation can be handled immediately when the phasing variation changes from a slow state to a rapid state, therefore, there is an effect of allowing the accuracy of channel estimation to be increased, also for a rapid phasing variation.

In addition, the present invention has an effect of reducing tremendously the amount of calculation of channel estimation by storing the channel estimate and the number of pilot symbols used for the channel estimation, which were calculated in advance, and using the stored channel estimate and number of pilot symbols when slow phasing variation is detected continuously.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Incorporation by Reference

This application is based upon and claims the benefit of priority from Japanese patent application No. 2005-058680, filed on Mar. 3, 2005, the disclosure of which is incorporated herein in its entirety by reference.

Industrial Applicability

The present invention is not limited to a mobile radio communication device, and may also be applied to a fixed radio communication device in which phasing occurs on a radio wave receiving state depending on the surrounding environment.

The invention claimed is:

1. A mobile radio communication device in which a parallel scheme whereby a pilot symbol is inserted in parallel with a data symbol is used and the maximum number of pilot symbol blocks that can be received used for one round of channel estimation calculation is fixed, comprising:

pilot symbol number determination unit which determines the number of pilot symbol blocks used for channel estimation in response to phasing variation;

channel estimate calculation unit which, when a channel is estimated using said determined number of pilot symbol blocks, calculates a channel estimate with said fixed maximum number of pilot symbol blocks that can be received as an initial value when the number of pilot symbol blocks more than or equal to said maximum number of pilot symbol blocks are detected, and calculates a channel estimate by using a number of detected pilot symbol blocks when the number of pilot symbol blocks less than said maximum number are detected; and storage unit which stores said channel estimate, and said number of pilot symbol blocks used for channel estimation, wherein said channel estimate calculation unit calculates a new channel estimate based on a new number of pilot symbol blocks in which a predetermined number is added to said stored number of pilot symbol blocks, said stored channels estimate, and a pilot symbol block detected this time when the maximum number of pilot symbol blocks are detected and said number of pilot symbol blocks stored in said storage unit is equal to or greater than a maximum number, and said storage unit stores the channel estimate calculated this time and the number of pilot symbol blocks used for channel estimation after overwriting said channel estimate and said number of pilot symbol blocks previously stored in said storage unit, respectively.

2. The mobile radio communication device according to claim 1, wherein said pilot symbol block is deployed in a pilot symbol sequence in parallel with a data symbol sequence.

3. The mobile radio communication device according to claim 1, wherein said phasing variation is determined from an inner product value of the pilot symbols.

4. The mobile radio communication device according to claim 3, wherein the number of pilot symbol blocks used for said channel estimation is determined according to said inner product value.

5. The mobile radio communication device according to any of claim 3 or claim 4, wherein the number of pilot symbol blocks used for said channel estimation is determined after said inner product value is divided and according to said division.

6. The mobile radio communication device according to claim 3, wherein the number of pilot symbol blocks used for said channel estimation is determined after a normalized inner product value is divided and according to said division.

7. The mobile radio communication device according to claim 1, wherein said phasing variation is determined from the movement velocity of the mobile radio communication device.

8. The mobile radio communication device according to claim 7, wherein said movement velocity is determined from GPS position information.

9. The mobile radio communication device according to claim 7 or claim 8, wherein the number of pilot symbol blocks used for said channel estimation is determined according to said movement velocity.

10. The mobile radio communication device according to claim 9, wherein the number of pilot symbol blocks used for said channel estimation is determined after said movement velocity is divided and according to said division.

11. The mobile radio communication device according to claim 9, wherein the number of pilot symbol blocks used for said channel estimation is determined by dividing said movement velocity by a normalized Doppler frequency fdTs where fd is a Doppler frequency, and Ts is one symbol timing.

12. A mobile radio communication device using a parallel scheme whereby a pilot symbol is inserted in parallel with a data symbol and having a function for receiving a data symbol and a pilot symbol from a station to estimate a channel of said data symbol with the station from said pilot symbol, comprising:

storage unit which stores a channel estimate and the number of pilot symbol blocks used for channel estimation; and channel estimate calculation unit which, when a channel is estimated using the number of pilot symbol blocks, calculates a channel estimate with the fixed maximum number of pilot symbol blocks that can be received as an initial value when the number of pilot symbol blocks more than or equal to the maximum number of pilot symbol blocks are detected, and calculates a channel estimate by using a number of detected pilot symbol blocks when the number of pilot symbol blocks less than said maximum number are detected, wherein said channel estimate calculation unit calculates a new channel estimate based on a new number of pilot symbol blocks in which a predetermined number is added to said stored number of pilot symbol blocks, said stored channels estimate, and a pilot symbol block detected this time when the maximum number of pilot symbol blocks are detected and said number of pilot symbol blocks stored in said storage unit is equal to or greater than the maximum number, and said storage unit stores the channel estimate calculated this time and the number of pilot symbol blocks used for channel estimation after overwriting said channel estimate and said number of pilot symbol blocks previously stored in said storage unit, respectively.

13. The mobile radio communication device according to claim 12, wherein said channel estimate calculation unit uses an average value of the number of pilot symbol blocks in which one is added to said number of pilot symbol blocks stored in said storage unit, and a newly detected pilot symbol to perform channel estimation when the slow state of the pre-divided phasing variation is detected continuously.

14. The mobile radio communication device according to claim 12, wherein said channel estimate calculation unit discards the number of pilot symbol blocks stored in said storage unit, and uses an average value of the newly determined number of pilot symbol blocks and a newly detected pilot symbol to perform channel estimation when the rapid state of the pre-divided phasing variation is detected.

15. A channel estimate calculation method using a parallel scheme whereby a pilot symbol is inserted in parallel with a data symbol, the method including the steps of:

determining the number of pilot symbol blocks used for channel estimation in response to phasing variation;

when a channel is estimated using said determined number of pilot symbol blocks, calculating a channel estimate with the fixed maximum number of pilot symbol blocks that can be received, which are used for one round channel estimation calculation, as an initial value when the number of pilot symbol blocks more than or equal to said maximum number of pilot symbol blocks are detected, and calculating a channel estimate by using a number of detected pilot symbol blocks when the number of pilot symbol blocks less than said maximum number are detected; and storing said channel estimate, and said number of pilot symbol blocks used for channel estimation, wherein said step of calculating a channel estimate includes:

a step of calculating a new channel estimate based on a new number of pilot symbol blocks in which a predetermined number is added to said stored number of pilot symbol blocks, said stored channels estimate, and a pilot symbol block detected this time when the maximum number of pilot symbol blocks are detected and said number of pilot symbol blocks stored in said storage unit is equal to or greater than the maximum number, and a step of storing the channel estimate calculated this time and the number of pilot symbol blocks used for channel estimation after overwriting said channel estimate and said number of pilot symbol blocks previously stored, respectively.

16. The channel estimate calculation method according to claim 15, wherein a pilot symbol block is deployed in a pilot symbol sequence in parallel with a data symbol sequence.

17. The channel estimate calculation method according to claim 15, wherein said phasing variation is determined from an inner product value of the pilot symbols.

18. The channel estimate calculation method according to claim 17, wherein the number of pilot symbol blocks used for said channel estimation is determined according to said inner product value.

19. The channel estimate calculation method according to any of claim 17 or claim 18, wherein the number of pilot symbol blocks used for channel estimation is determined after said inner product value is divided and according to said division.

20. The channel estimate calculation method according to claim 17, wherein the number of pilot symbol blocks used for said channel estimation is determined after a normalized inner product value is divided and according to said division.

21. The channel estimate calculation method according to claim 15, wherein said phasing variation is determined from the movement velocity of the mobile radio communication device.

22. The channel estimate operating method according to claim 21, wherein said movement velocity is determined from GPS position information.

23. The channel estimate calculation method according to claim 21 or claim 22, wherein the number of pilot symbol blocks used for channel estimation is determined according to said movement velocity.

24. The channel estimate calculation method according to claim 23, wherein the number of pilot symbol blocks used for channel estimation is determined after said movement velocity is divided and according to said division.

25. The channel estimate calculation method according to claim 23, wherein said number of pilot symbol blocks used for channel estimation is determined by dividing said movement speed by a normalized Doppler frequency fdTs.

26. A channel estimate calculation method of a mobile radio communication device using a parallel scheme whereby a pilot symbol is inserted in parallel with a data symbol and having a function for receiving a data symbol and a pilot symbol from a station to estimate a channel of said data symbol with the station from said pilot symbol, including the steps of:

storing a channel estimate and the number of pilot symbol blocks used for channel estimation, and when a channel is estimated using said determined number of pilot symbol blocks, calculating a channel estimate with the fixed maximum number of pilot symbol blocks that can be received, which are used for one round channel estimation calculation, as an initial value when the number of pilot symbol blocks more than or equal to said maximum number of pilot symbol blocks are detected, and calculating a channel estimate by using a number of detected pilot symbol blocks when the number of pilot symbol blocks less than said maximum are detected, wherein said step of calculating a channel estimate includes:

a step of calculating a new channel estimate based on a new number of pilot symbol blocks in which a predetermined number is added to said stored number of pilot symbol blocks, said stored channels estimate, and a pilot symbol block detected this time when the maximum number of pilot symbol blocks are detected and said number of pilot symbol blocks stored in said storage unit is equal to or greater than the maximum number, and a step of storing the channel estimate calculated this time and the number of pilot symbol blocks used for channel estimation after overwriting said channel estimate and said number of pilot symbol blocks previously stored, respectively.

27. The channel estimate calculation method according to claim 26, wherein said step of performing channel estimation uses an average value of the number of pilot symbol blocks in which one is added to said stored number of pilot symbol blocks, and a newly detected pilot symbol to perform channel estimation when the slow state of the pre-divided phasing variation is detected continuously.

28. The channel estimate calculation method according to claim 26, wherein said step of performing channel estimation discards the stored number of pilot symbol blocks, and using an average value of the newly determined number of pilot symbol blocks and a newly detected pilot symbol to perform channel estimation when the rapid state of the pre-divided phasing variation is detected.

* * * * *

UNITED STATES PATENT AND TRADEMARK OFFICE
CERTIFICATE OF CORRECTION

PATENT NO. : 8,306,152 B2  
APPLICATION NO. : 11/817053  
DATED : November 6, 2012  
INVENTOR(S) : Norihiro Iwagami Page 1 of 1

It is certified that error appears in the above-identified patent and that said Letters Patent is hereby corrected as shown below:

In the Specification

Column 7, Line 51: delete "1QAM." and insert -- 16QAM. --

Column 9, Line 40: delete "v'5" and insert -- $\xi'5$ --

Column 9, Line 42: delete "En" and insert -- $\xi n$ --

Column 10, Line 53: delete "$\xi'1$" and insert -- $\xi''1$ --

Column 12, Line 58: delete ""S"" and insert -- "5" --

Column 15, Line 23: delete ""3/"" and insert -- "3" --

Column 15, Line 60: delete ""S"," and insert -- "5", --

Signed and Sealed this  
Ninth Day of September, 2014

Michelle K. Lee  
*Deputy Director of the United States Patent and Trademark Office*